J. JANICKI.
SPEED REDUCING MECHANISM.
APPLICATION FILED OCT. 17, 1919.
1,355,607.
Patented Oct. 12, 1920.
4 SHEETS—SHEET 1.
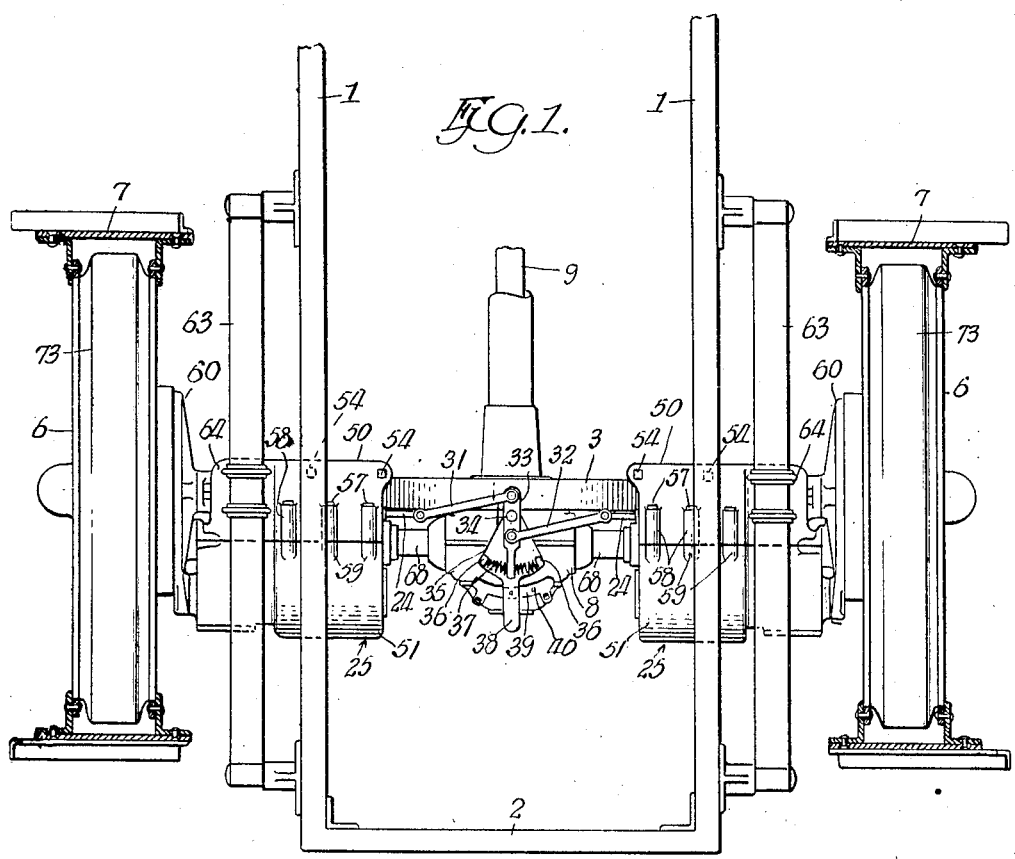
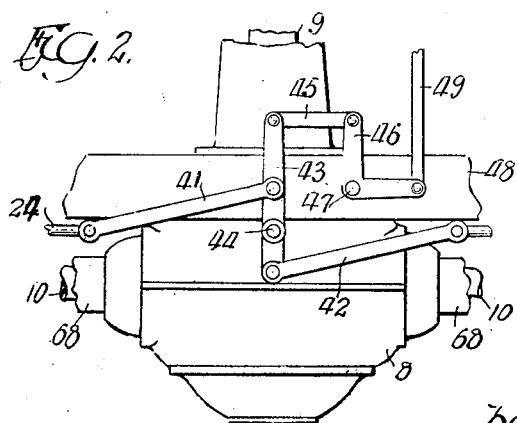
Inventor
John Janicki
by Eugene Ewans, Atty.

J. JANICKI.
SPEED REDUCING MECHANISM.
APPLICATION FILED OCT. 17, 1919.
1,355,607.
Patented Oct. 12, 1920.
4 SHEETS—SHEET 2.
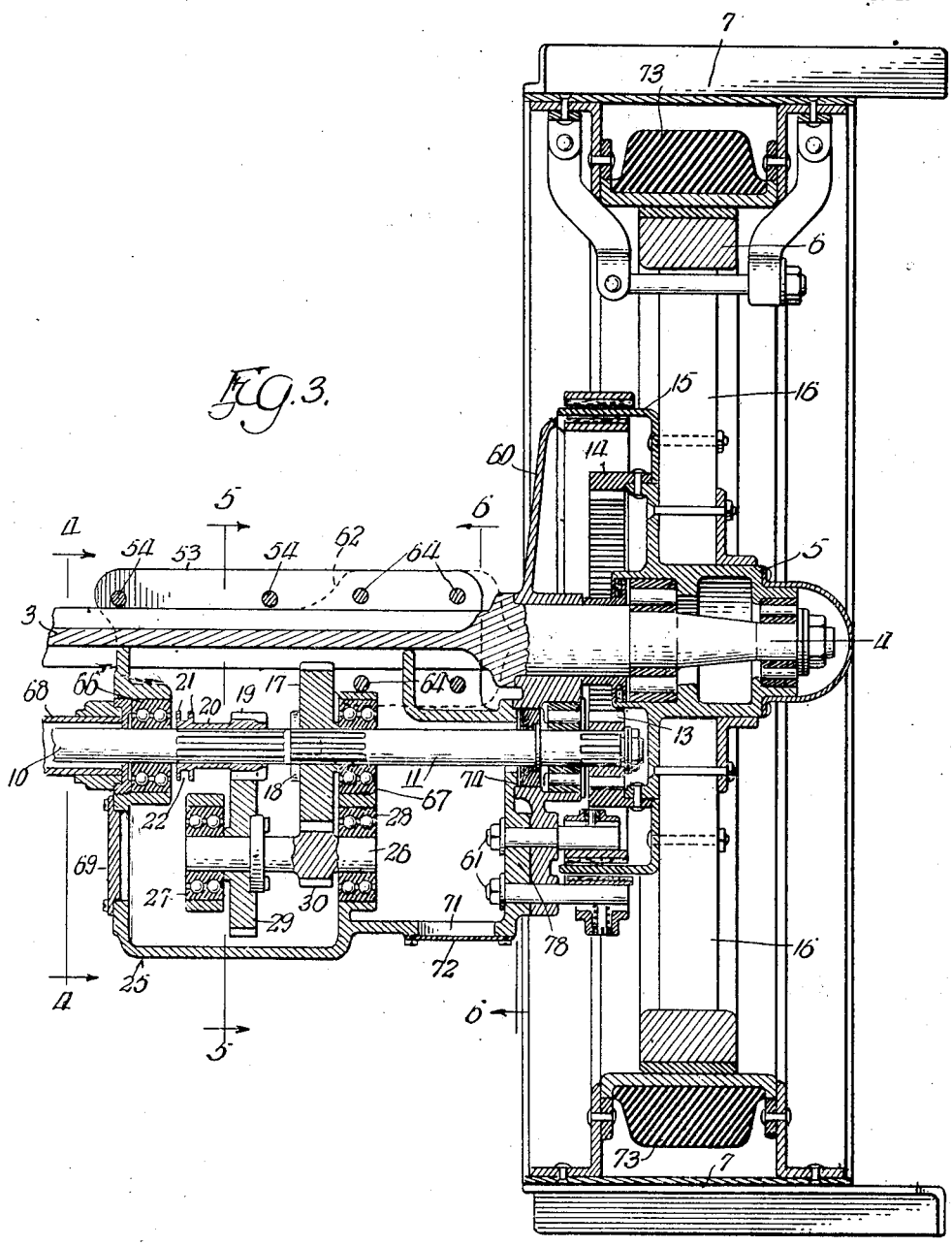
Inventor
John Janicki
By Eugene Ellery Atty

J. JANICKI.
SPEED REDUCING MECHANISM.
APPLICATION FILED OCT. 17, 1919.

1,355,607.

Patented Oct. 12, 1920.
4 SHEETS—SHEET 3.

Inventor
John Janicki
by Eugene E. Warren Atty

J. JANICKI.
SPEED REDUCING MECHANISM.
APPLICATION FILED OCT. 17, 1919.
1,355,607.
Patented Oct. 12, 1920.
4 SHEETS—SHEET 4.
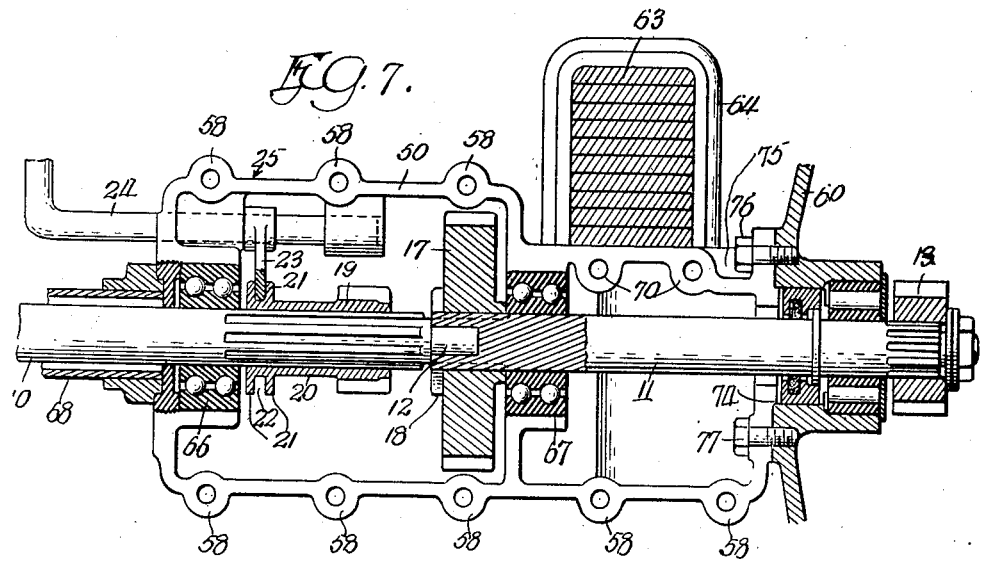
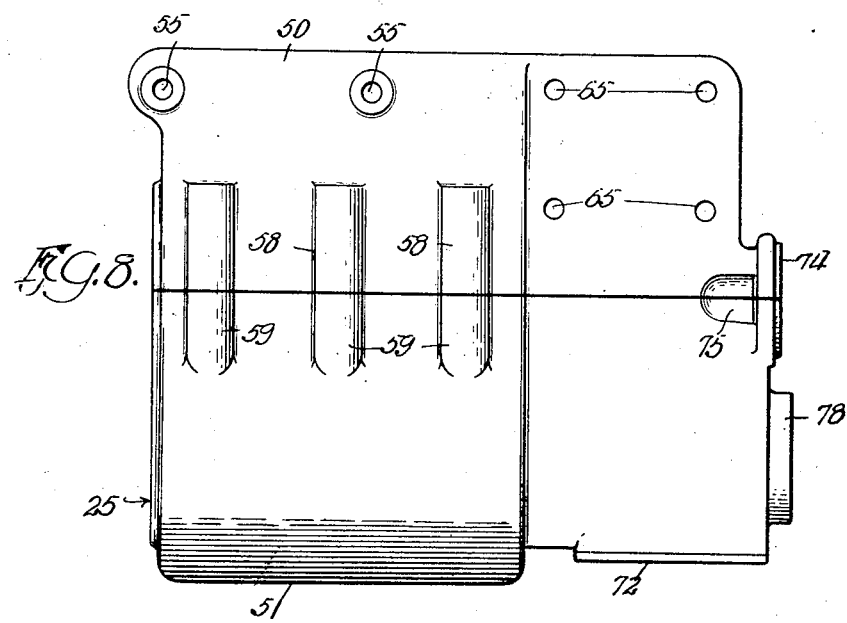
Inventor
John Janicki
by Eugene Cohen Atty

UNITED STATES PATENT OFFICE.

JOHN JANICKI, OF CHICAGO, ILLINOIS, ASSIGNOR TO URSUS MOTOR COMPANY, OF CHICAGO, ILLINOIS, A CORPORATION OF ILLINOIS.

SPEED-REDUCING MECHANISM.

1,355,607.   Specification of Letters Patent.   Patented Oct. 12, 1920.

Application filed October 17, 1919. Serial No. 331,259.

*To all whom it may concern:*

Be it known that I, JOHN JANICKI, a citizen of the United States, residing at Chicago, in the county of Cook and State of Illinois, have invented new and useful Improvements in Speed-Reducing Mechanisms, of which the following is a specification.

This invention relates to speed reducing mechanisms for motor vehicles so that an additional reduction of speed may be had at the will of the operator between the propeller shaft and the traction wheels, so that the motor vehicle may be used either as originally designed or for tractor purposes, as for pulling heavy loads or gang plows or tillers' other implements.

The object of the invention is to provide a form of speed reducing mechanism for the purpose stated and consists in the matters hereinafter described and more particularly pointed out in the appended claims.

In the accompanying drawings—

Figure 1 is a top plan view of the rear end of the chassis or frame of a motor truck and showing a speed reducing mechanism of my invention interposed between each rear wheel and the propeller shaft of said truck;

Fig. 2 is a top plan view of a form of lever arrangement for shifting the slide gear wheel of the two speed reducing mechanisms from the cab or seat of the truck or motor vehicle;

Fig. 3 is a horizontal sectional view taken on line 3—3 of Fig. 4;

Figure 4:
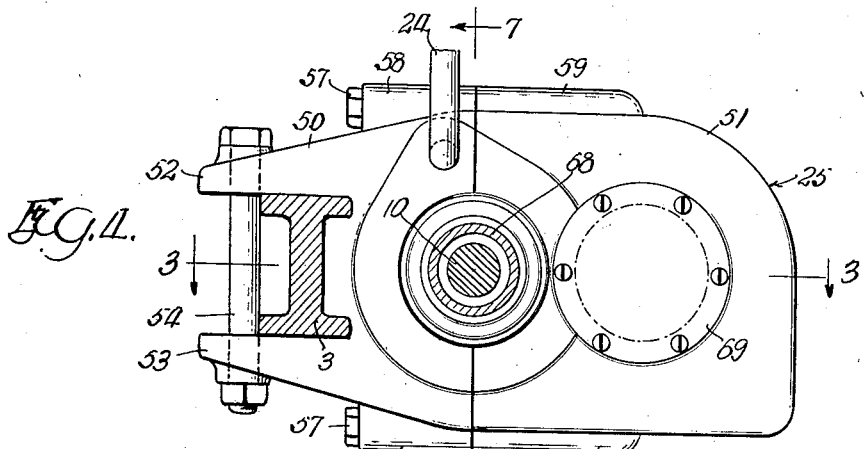
Figure 5:
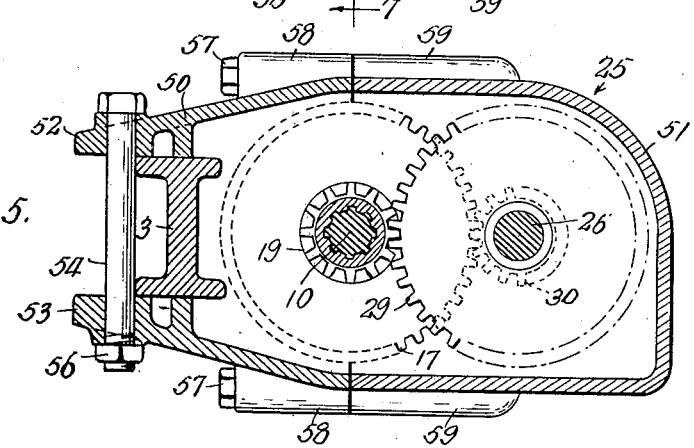
Figure 6:
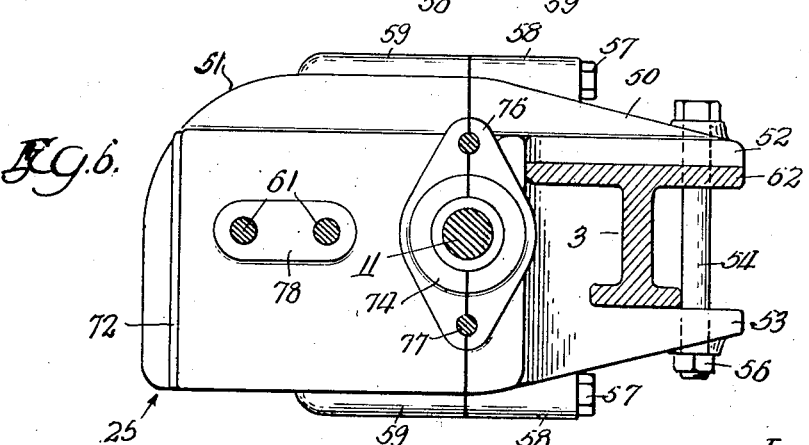

Figs. 4, 5, and 6 are vertical sectional views taken on lines 4—4, 5—5, and 6—6, respectively, of Fig. 3;

Fig. 7 is a longitudinal sectional view taken on line 7—7 of Fig. 4; and

Fig. 8 is a top plan view of one of the casings inclosing the gear wheels of one of said speed reducing mechanisms.

As shown in Fig. 1, the chassis or main frame of a motor vehicle, such as a truck, comprises two side members 1, 1 and a cross member 2 at the rear end thereof. Extending across and beneath the frame is the dead axle 3, usually in the form of an I-beam and having its ends cylindric and tapered, as at 4, to receive the hubs 5 of the rear or driving wheels 6. To use the truck for tractor purposes, each of its rear wheels may be replaced by a tractor wheel, or, as shown in the drawings, the truck wheels may be converted into tractor wheels by having tractor treads 7 applied about the same. Secured to the dead axle 3, between its ends, is a housing 8 containing the differential mechanism of the usual type and with which the truck is equipped as originally built. Extending forward from such mechanism is a propeller shaft 9, as customary in truck constructions, and from each side of the differential housing 8 extends a live axle 10 having at its end within said housing a gear wheel of the differential mechanism. The variable speed transmission mechanism usually interposed between the propeller shaft 9 and the motor of the vehicle, is not shown.

To permit the motor vehicle shown to be used for tractor purposes, I provide between each rear or driving wheel 6 and the differential mechanism 8, a speed reducing mechanism constructed as follows. As the construction and operation of such mechanism on each side of the differential 8 is the same, a description of one will suffice for both.

As shown in the drawings, the live axle 10 is provided with an outer alined section 11 having a recess to receive a reduced portion 12 at the meeting end of the section 10, so that the live axle comprises two parts which may be rotated relatively to each other. The section 11 has fixed to its outer end a gear pinion 13, which is constantly in mesh with an internal gear member 14 secured to the hub 5 of the rear wheel 6 and located in the brake drum 15, the latter being secured to the spokes 16 on the inside of said wheel. Fixed on the opposite end of the section 11 is a gear wheel 17 provided on its inner face with clutch teeth 18 to enter between the teeth of a gear pinion 19 splined on the shaft section 10, as shown in Fig. 3. Said gear pinion 19 is provided with a sleeve 20 having spaced annular flanges 21, 21 to provide a groove 22 to receive a yoke 23 secured to an endwise movable shift rod 24 slidably mounted in a casing 25 inclosing said gear wheels and to be hereinafter described. Journaled in said casing 25 is a lay shaft 26 arranged parallel to the shaft sections 10 and 11 and spaced horizontally rearward therefrom, as shown in Figs. 3 and 5. Said shaft 26 is journaled in bearings 27, 28 mounted in the casing, and is provided with a gear wheel 29 and a gear pinion 30, both fixed thereto. The gear wheel 29 meshes with the gear pinion 19 when the latter has been moved endwise on the shaft section 10 into position for that purpose, while the gear pinion 30 is constantly in mesh with the gear wheel 17 fixed on the shaft section 11. The parts are shown in such positions in Fig. 3, and it follows that when the shaft section 10 is driven by the propeller shaft 9, power will be transmitted to the shaft section 11 through the intermeshing gear wheels 19, 29, 30, and 17, in the order named, and the shaft section 11 will transmit the power to the associated rear wheel 6 through the gear pinion 13 and the internal gear member 14. The speed of the shaft section 11 and the rear wheels 6 will thus be less than the speed of the shaft section 10, due to the reduction brought about by said gear wheels, and the rear wheels 6 will be rotated relatively slow and gain the increased power required to adapt the vehicle for tractor purposes. Should it be desired to rotate the rear wheels 6 at the same rate of speed as the shaft section 10 and thus allow the motor vehicle to be used for purposes originally intended, the gear pinion 19 is shifted by the lever 24 out of mesh with the gear wheel 29 and into engagement with the clutch teeth 18 on the gear wheel 17. The shaft sections 10, 11 will then be directly connected together and be rotated at the same rate of speed. Before this is effected, however, the tractor treads 7 will first be removed, or, if tractor wheels are employed, the same will be replaced by the original vehicle wheels.

In order to shift the gear pinions 19 simultaneously and from one point, a suitable shift lever arrangement is provided, one form of which is shown in Fig. 1. As there illustrated, a link 31 is pivotally connected to the left-hand shift rod 24, and a link 32 is pivotally connected to the right-hand shift rod 24. The inner ends of said links are both pivotally connected with a lever 33, the latter being pivoted between said links, by a stud 34, to a stationary part of the vehicle frame, such as the housing 8. Also pivoted on said stud 34 is a plate 35 having upwardly projecting lugs 36, between which one end of the lever 33 extends. Springs 37 normally hold such end of the lever 33 between said lugs. The plate 35 is provided with a rigid operating handle 38 extending rearwardly and movable over an arc-shaped sector plate 39 secured to the housing 8. When the parts are in the positions shown in Fig. 1, the gear pinions 19 are held in mesh with the gear wheels 29 so that the driving wheels 6 will be rotated at the reduced speed required for tractor purposes. To hold the parts in such positions, the operating handle 38 and the sector plate 39 are provided with coacting latch members such as a boss on one part and a socket in the other, as shown. To shift the gear pinions 19 into clutch connection with the gear wheels 17, the handle 38 is grasped and moved toward the right, thus causing the left-hand spring 37 to exert a force toward the right and move the lever 33 in that direction and, through the links 31, 32, move the shift rods 24 and the gear pinions 19 connected therewith. When the latch member on said handle engages a coacting part 40 on the sector plate, the parts will be held in such positions. To shift the gear pinions 19 out of clutched engagement with the gear wheels 17 and into mesh with the gear wheels 29, the handle 38 is moved toward the left, as is apparent.

The type of gear shifting lever arrangement, as shown in Fig. 1, is operable only from the rear of the vehicle, that is, the operator must reach under the rear of the frame to grasp the handle 38. In Fig. 2 I have shown a lever arrangement whereby the shift rods 24, 24 may be operated from a point at the front of the vehicle, for instance from the driver's seat. As shown in Fig. 2, there are links 41, 42, one for each shift rod and both pivotally connected with a lever 43 fulcrumed at 44 on a fixed part of the vehicle frame. The lever 43 extends forward from its point of connection with the link 41 and has pivotal connection at its forward end with another link 45, the latter being pivotally connected with one arm of a bell crank lever 46 fulcrumed at 47 on the dead axle 48. The other arm of the bell crank lever is pivotally connected with a rod 49 extending to the front of the vehicle and there, by a suitable arrangement of levers, is connected with either a foot pedal or hand lever at the driver's seat. By means of such construction, the driver from his seat may effect a shifting of the gear pinions 19 and thus throw the rear wheels of the vehicle into either truck speed or tractor speed when required.

The casing 25 of each speed reducing mechanism is made in two parts 50, 51, the joint line between them being in a vertical plane passing through the axis of rotation of the shaft sections 10, 11, as shown in Figs. 4 to 6. The part 50 is connected with the dead axle 3 and for that purpose is provided with a recess in its back wall to receive said axle, with portions 52, 53 extending across and above and below the same toward the front end of the vehicle. Clamp bolts 54 inserted through alined bolt holes 55 in the upper and lower parts 52, 53, secure the casing section 50 to the dead axle 3, as shown. The bolts are headed at their upper ends and receive clamp nuts 56 on their threaded lower ends. The two sections of the casing 25 are clamped together by horizontally arranged fastening screws 57, 57, one set above and the other below the housing sections and threaded into registering bosses 58, 59 formed on said sections. The casing 25 has a length to extend to the cover 60 of the brake drum, and is secured thereto by fastening members 61, 61, as shown in Fig. 3. The upper flange of the dead axle, as at 62, is widened to provide a wide bearing for the rear springs 63, 63. Said springs 63 are secured to the vehicle frame by shackles, in the well known manner, and to the dead axle 3 by inserted U bolts 64, 64, as is the usual practice. The top wall of the casing section 50 extends beneath the spring 63, and said top wall and bottom wall are provided with bolt holes 65 to receive said U bolts, as shown in Figs. 3 and 8.

The shaft sections 10, 11 are journaled in bearings 66, 67 in the casing 25, and the shaft section 10 is inclosed in a tubular casing 68 extending between the casing 25 and the housing 8 of the differential mechanism. The end wall of the casing 25 facing the differential housing 8 is provided with a removable cover plate 69 closing the opening through which access may be had into that portion of the casing containing the counter shaft and gear wheels. The joint between the casing sections extends beneath the vehicle spring 63, as shown in Figs. 1 and 7, and the top walls of such portions of the sections have the bosses 70 within the casing so that the top surface thereof will be free of projections to permit the spring to rest thereon. To facilitate reaching the screws that enter such bosses from the exterior of the casing, the latter is provided in its front wall with an opening 71 closed by a removable cover plate 72. The type of vehicle wheel 6 shown in the drawings is provided with a cushion tire 73.

To prevent the casing 25 from being twisted out of its proper position, I provide the following construction. The end wall of the casing at the drum cover 60 is provided with an outwardly projecting, annular boss 74 to fit into an opening in the drum cover 60, through which the shaft section 11 extends, as shown in Fig. 7. The shaft section 11 also extends through the opening in the end wall of the casing, about which the boss 74 extends, and as the casing is split longitudinally in a plane passing through the shaft sections 10 and 11, it follows that one-half of said boss is on one section of the casing and the other half on the other section thereof. The top wall of the casing at such point is depressed, as at 75 (Fig. 8), to receive the head of a fastening screw 76 inserted through the casing sections above the boss 74 and into the stationary drum cover 60. Another screw 77 extends through the casing sections at the line of joint therebetween and engages the cover 60 below the shaft section 11, as shown in Fig. 7. The fastening members 61 also extend through an outwardly projecting boss-like member 78 on the outer section of the casing and which part fits flatwise against the drum cover 60. By the construction described the casing 25 is rigidly secured to the dead axle 3 and the stationary drum cover 60 and is prevented from being twisted with respect thereto, either by the shaft sections 10, 11 in the rotation thereof or by the shocks and jars to which the parts are subjected while in use on a motor vehicle.

A motor vehicle equipped with an additional speed reducing mechanism of my invention, may be put to more uses than originally intended, and thus be made to give a greater degree of service. When it is desired to use the vehicle for tractor purposes, the reduction of speed required may be quickly and easily made without in any manner affecting the vehicle for use when required as originally intended. Furthermore, the device comprises a minimum number of parts and may be readily incorporated in a motor vehicle as already built, and efficiently perform the purposes for which it is designed.

While I have shown and described herein in detail speed reducing mechanisms embodying the features of my invention, it is to be of course understood that the details of construction and arrangement of parts shown may be variously changed and modified without departing from the spirit and scope of my invention, and further that such mechanisms may be located at any point found most desirable between the source of power and the driving wheels of a motor vehicle, whether of the truck or other type.

I claim as my invention:

1. In combination in a motor vehicle, a propeller shaft, two traction wheels, a differential mechanism between said propeller shaft and said traction wheels, and a power transmitting connection between each traction wheel and said differential mechanism, including a change speed mechanism comprising two alined live axle sections, a lay shaft, a gear wheel fixed to one of said axle sections and being constantly in mesh with a gear pinion fixed on said lay shaft, and a gear pinion slidably mounted on the other of said axle sections and adapted to be moved into and out of mesh with a second gear wheel fixed to said lay shaft and into and out of clutch with the gear wheel on said first mentioned axle section.

2. In combination in a motor vehicle, a dead axle, two traction wheels mounted thereon, a propeller shaft, a live axle having two sections, one on each side of said propeller shaft and having an internal gear driving connection with the associated traction wheel, said live axle sections being connected at their inner ends with said propeller shaft by a differential mechanism, two change speed mechanisms, one between the differential mechanism and each traction wheel and connected with the live axle section therebetween, and means for shifting said change speed mechanisms simultaneously.

3. In combination in a motor vehicle, a dead axle, two traction wheels mounted thereon, a propeller shaft, a live axle having two sections, one on each side of said propeller shaft and having an internal gear driving connection with the associated traction wheel, said live axle sections being connected at their inner ends with said propeller shaft by a differential mechanism, two change speed mechanisms of the slide gear type, one between the differential mechanism and each traction wheel and connected with the live axle section therebetween, a separate casing for and inclosing each change speed mechanism, and both casings being secured to said dead axle, and means for shifting said change speed mechanism simultaneously.

4. In combination in a motor vehicle, a dead axle, two traction wheels mounted thereon, a propeller shaft, a power transmitting connection between each traction wheel and said propeller shaft, including a change speed reducing mechanism, a casing inclosing the change speed mechanism for each traction wheel and secured to said dead axle, and means preventing each casing from turning about said dead axle.

5. In combination in a motor vehicle, a dead axle, two traction wheels mounted thereon, a propeller shaft, a differential mechanism between said propeller shaft and said traction wheels, each of said wheels having a brake drum and a stationary cover therefor, a power transmitting connection between each traction wheel and said differential mechanism, including a change speed reducing mechanism, and a casing inclosing the change speed mechanism for each wheel and secured to said dead axle and to the adjacent drum cover.

6. In combination in a motor vehicle, a dead axle, two traction wheels mounted thereon, a propeller shaft, a differential mechanism between said propeller shaft and said traction wheels, a power transmitting connection between each traction wheel and said propeller shaft, including a change speed mechanism, a two part casing inclosing the change speed mechanism for each traction wheel, means for clamping the casing parts together, and means for connecting one of said casing parts to said dead axle.

7. In combination in a motor vehicle, a dead axle, two traction wheels mounted thereon, a propeller shaft, a differential mechanism between said propeller shaft and said traction wheels, each of said wheels having a brake drum and a stationary cover therefor, a power transmitting connection between each traction wheel and said differential mechanism, including a live axle composed of two alined sections connected together by change speed gear wheels, and a casing inclosing the live axle and speed gears for each traction wheel and having at its end wall facing a drum cover, an outwardly projecting annular boss surrounding the opening through which the live axle extends and fitting into the drum cover, and means clamping each casing to said dead axle and its adjacent drum cover.

8. In combination in a motor vehicle, a propeller shaft, two traction wheels, a live axle having two sections, one on each side of said propeller shaft and connected with the associated traction wheel to turn the same, said live axle sections being connected at their inner ends to said propeller shaft by a differential mechanism, two change speed mechanisms of the slide gear type, one between the differential mechanism and each traction wheel and included in the live axle section therebetween, a separate casing for and inclosing each change speed mechanism, a shift rod connected with the slide gear wheel in each change speed mechanism and extending outward through the casing of the change speed mechanism toward the differential mechanism, and means connected with the opposed ends of said rods to move the same simultaneously to effect the shifting of said slide gears.

9. In combination in a motor vehicle, a propeller shaft, two traction wheels, a differential mechanism between said propeller shaft and said traction wheels, a power transmitting connection between each traction wheel and said differential mechanism, including a speed reducing mechanism of the slide gear type, a shift rod for the slide gear of each speed reducing mechanism, a lever pivoted to the casing of said differential mechanism, links connecting said rods to said lever, a plate pivoted to said casing and having lugs between which said lever extends, spring means extending between and engaging said lever and said lugs, and an operating handle secured to said plate and extending toward one end of the vehicle.

In testimony that I claim the foregoing as my invention, I affix my signature, this 15th day of October, A. D. 1919.

JOHN JANICKI.